US007892516B2

(12) United States Patent
Dai et al.

(10) Patent No.: US 7,892,516 B2
(45) Date of Patent: Feb. 22, 2011

(54) ROBUST CARBON MONOLITH HAVING HIERARCHICAL POROSITY

(75) Inventors: Sheng Dai, Knoxville, TN (US); Georges A Guiochon, Farragut, TN (US); Chengdu Liang, Knoxville, TN (US)

(73) Assignees: UT-Battelle, LLC, Oak Ridge, TN (US); University of Tennessee Research Foundation, Knoxville, TN (US)

( * ) Notice: Subject to any disclaimer, the term of this patent is extended or adjusted under 35 U.S.C. 154(b) by 269 days.

(21) Appl. No.: 12/145,927

(22) Filed: Jun. 25, 2008

(65) Prior Publication Data

US 2009/0044606 A1 Feb. 19, 2009

Related U.S. Application Data

(63) Continuation of application No. 10/770,734, filed on Feb. 3, 2004, now Pat. No. 7,449,165.

(51) Int. Cl.
*C01B 31/00* (2006.01)
(52) U.S. Cl. .................................. 423/445 R; 210/496
(58) Field of Classification Search ............. 423/445 R; 210/496
See application file for complete search history.

(56) References Cited

U.S. PATENT DOCUMENTS

| 4,978,649 A | * | 12/1990 | Surovikin et al. | ........... 502/416 |
| 5,902,562 A | | 5/1999 | Lagasse et al. | |
| 6,024,899 A | | 2/2000 | Peng et al. | |
| 6,515,845 B1 | | 2/2003 | Oh et al. | |
| 6,737,445 B2 | | 5/2004 | Bell et al. | |
| 2005/0169829 A1 | | 8/2005 | Dai et al. | |

OTHER PUBLICATIONS

Liang, Chengdu, et al., "A Graphitized-Carbon Monolithic Column," Anal. Chemistry, 2003, p. 4904-4912, vol. 75.
Gzil, Piotr et al., "A Computational Study of the Porosity Effects in Silica Monolithic Columns," J. Sep. Sci., 2004, p. 887-896, vol. 27.
Taguchi, Akira, et al., "Carbon Monoliths Possessing a Hierarchical, Fully Interconnected Porosity", Adv. Mat., 2003, 15, No. 14, 1209-1211.
Polarz, S., et. ll., "Hierachical Porous Carbon Structures from Cellulose Acetate Fibers", Chem. Mat., 2002, 14, 2940-2945.

* cited by examiner

*Primary Examiner*—Stuart Hendrickson
(74) *Attorney, Agent, or Firm*—Scully, Scott, Murphy & Presser, P.C.

(57) ABSTRACT

A carbon monolith includes a robust carbon monolith characterized by a skeleton size of at least 100 nm, and a hierarchical pore structure having macropores and mesopores.

16 Claims, 9 Drawing Sheets

⊢──────────┤ 1 μm

⊢―――⊣ 1 μm

⊢―――⊣ 10 μm

013 # ROBUST CARBON MONOLITH HAVING HIERARCHICAL POROSITY

This application is a continuation of U.S. application Ser. No. 10/770,734 filed on Feb. 3, 2004, now U.S. Pat. No. 7,449,165 the specification of which is incorporated herein by reference in its entirety.

The United States Government has rights in this invention pursuant to contract no. DE-AC05-00OR22725 between the United States Department of Energy and UT-Battelle, LLC.

FIELD OF THE INVENTION

The present invention relates to carbon monoliths having hierarchical porosity, and more particularly to robust carbon monoliths characterized by macropores and mesopores.

BACKGROUND OF THE INVENTION

The invention addresses two different and independent difficulties in the art of liquid chromatography.

Firstly, there is a lack of robust stationary phases for high performance liquid chromatography (HPLC) that provide broadly useful retention and separation patterns. Benefiting from the superior hydraulic and mass transfer kinetic properties of a monolithic structure, a variety of monolithic columns have been developed for fast separations during the last few years. These well known monolithic columns are categorized in to two general groups: silica-based columns and polymeric columns. Silica-based stationary phases are generally feasible only with mobile phases having a pH in the range of 3 to 10. Moreover, although polymeric phases are not as pH-limited, they are often degraded rapidly when used with certain common organic solvents and/or at high temperatures. Thus, there is a need for a rugged monolithic column made with a stationary phase that can be used in a wide range of chemical environments and at elevated temperatures.

Electrochemically modulated liquid chromatography (EMLC) requires an electrically conductive stationary phase, which generally excludes all silica-based and most polymeric stationary phases. Carbon-based particulate stationary phases are currently the only type of stationary phases used for EMLC. Conventional beds packed with porous graphite particles suffer from a poor electrical conductivity, hence from a heterogeneous distribution of the electric charges of the particles. The electrical equilibrium of the column can only be achieved after washing it for a very long time with the mobile phase. This causes a slow adjustment of the experimental conditions and the waste of valuable chemicals. The development of EMLC has been considerably slowed down by the lack of a suitable stationary phase.

Carbon monoliths having hierarchical porosity have been made using a silica monolith having hierarchical porosity as a template. Carbon monoliths made thereby take the shape of the voids (pores) of the template and are of very low density and are not structurally robust. Such carbon monoliths are known to undergo structural collapse under an electron beam of an electron microscope. A robust carbon monolith having hierarchical porosity is needed for applications such as chromatography and other chemical separations.

OBJECTS OF THE INVENTION

Accordingly, objects of the present invention include provision of: a robust carbon monolith having hierarchical porosity; a robust carbon monolith characterized by macropores and mesopores; a monolithic column for HPLC that can be used in a wide range of chemical environments and at elevated temperatures; a highly conductive monolithic column for HPLC; a method of synthesis of a porous carbon monolith; use of any of the foregoing as a versatile HPLC column bed; use of any of the foregoing as a highly conductive EMLC column; and a robust material that is characterized by a combination of chemical merits of a high specific surface area carbon adsorbent and superior hydrodynamic properties of a monolithic structure. Further and other objects of the present invention will become apparent from the description contained herein.

SUMMARY OF THE INVENTION

In accordance with one aspect of the present invention, the foregoing and other objects are achieved by a carbon monolith that includes a robust carbon monolith characterized by a skeleton size of at least 100 nm, and a hierarchical pore structure having macropores and mesopores.

In accordance with another aspect of the present invention, a monolithic chromatography column includes a robust monolithic carbon stationary phase disposed in a chromatography column, the monolithic carbon stationary phase characterized by a skeleton size of at least 100 nm.

In accordance with another aspect of the present invention, a method of preparing a robust carbon monolith includes the steps of: providing a carbon monolith precursor having a porosity-generating fugitive phase dispersed therein, the fugitive phase comprising mesoparticles and microparticles; carbonizing the carbon monolith precursor to form a carbon monolith: and removing the fugitive phase from the carbon monolith to form a robust, porous carbon monolith characterized by a skeleton size of at least 100 nm, and a hierarchical pore structure having macropores and mesopores.

In accordance with another aspect of the present invention, a method of preparing a robust carbon monolith includes the steps of: providing a carbon monolith precursor having a particulate porosity-generating fugitive phase dispersed therein, the fugitive phase comprising mesoparticles and microparticles; and heating the carbon monolith precursor to carbonize the carbon monolith precursor, and to remove the fugitive phase from the carbon monolith, to form a robust, porous carbon monolith characterized by a skeleton size of at least 100 nm, and a hierarchical pore structure having macropores and mesopores.

In accordance with another aspect of the present invention, a method of preparing a monolithic chromatography column includes the steps of: providing a carbon monolith precursor having a porosity-generating fugitive phase dispersed therein; carbonizing the carbon monolith precursor to form a carbon monolith; removing the fugitive phase from the carbon monolith to form a robust, porous carbon monolith characterized by a skeleton size of at least 100 nm, and a hierarchical pore structure having macropores and mesopores; and encapsulating the porous carbon monolith to form a chromatographic column.

In accordance with another aspect of the present invention, a method of preparing a monolithic chromatography column includes the steps of: providing a carbon monolith precursor having a porosity-generating fugitive phase dispersed therein; heating the carbon monolith precursor to carbonize the carbon monolith precursor to form a carbon monolith, and to remove the fugitive phase from the carbon monolith; and encapsulating the porous carbon monolith to form a chromatographic column.

Figure 1:
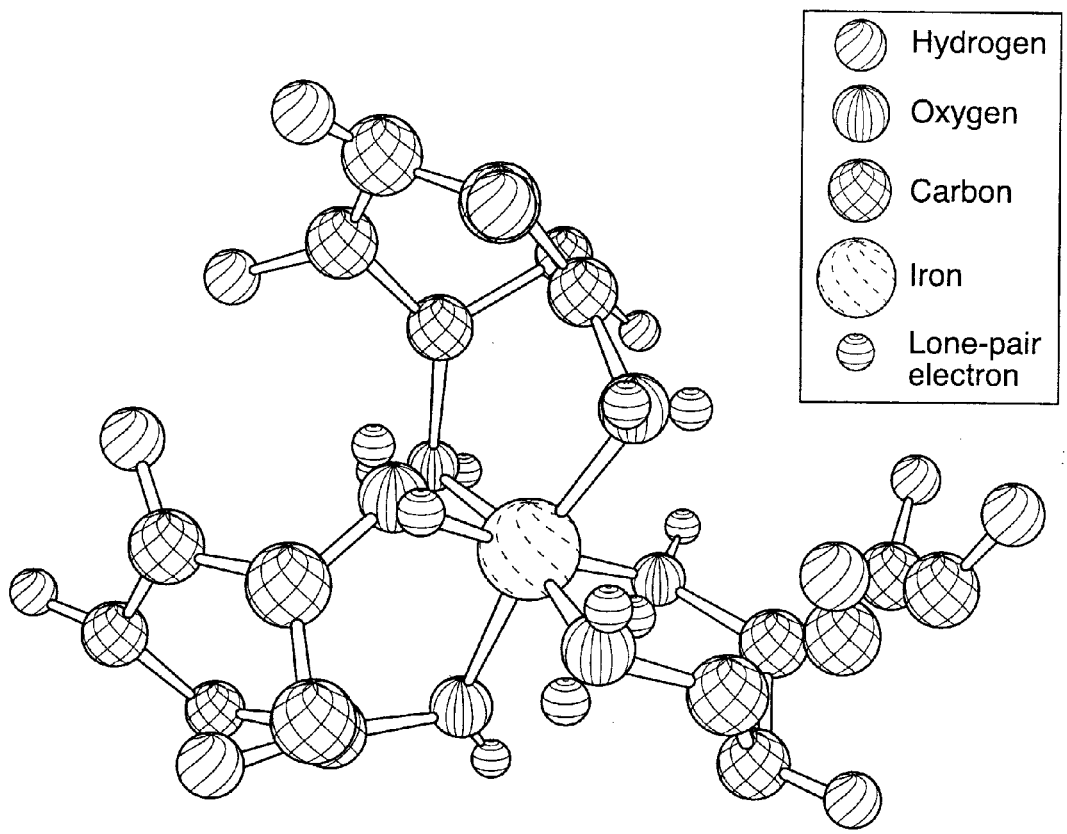
FIG. 1 is a schematic illustration of the three-dimensional molecular structure of the resorcinol iron (III) complex.

For a better understanding of the present invention, together with other and further objects, advantages and capabilities thereof, reference is made to the following disclosure and appended claims in connection with the above-described drawings.

DETAILED DESCRIPTION OF THE INVENTION

In accordance with the present invention, a robust, hierarchically porous carbon monolith is characterized by a combination of:

1. Macropores having a size in the range of 0.05 μm to 100 μm, preferably in the range of 0.1 μm to 50 μm, more preferably in the range of 0.8 μm to 10 μm;

2. Mesopores having a size range of 18 Å to 50 nm, preferably in the range of 0.5 nm to 40 nm, more preferably in the range of 5 nm to 30 nm; and 3. A skeleton size (monolith wall thickness) in the range of 100 nm to 20 μm, preferably in the range of 200 nm to 10 μm, more preferably in the range of 400 nm to 1 μm.

Graphitized carbon can serve as a highly inert stationary phase that can be used under harsh experimental conditions, e.g., with an extremely acidic or basic solution as the mobile phase in HPLC applications. The robust monolithic structure permits the achievement of a high permeability and fast mass transfer kinetics. Moreover, the column has a low backpressure and fast HPLC separations can be performed. Some advantages of a carbon monolithic liquid chromatography column include: a combination of the chemical merits of a high specific surface area carbon adsorbent and a superior hydrodynamic properties of a monolithic structure.

Another unique feature of a carbon monolithic column is its excellent electrical conductivity. It is possible to modulate retention by adjusting the potential of the carbon surface. Thus, a carbon monolithic column is ideal for EMLC because the high electrical conductivity allows a homogeneous surface potential over the entire column and a rapid equilibrium after changes of the applied external electric field.

The present invention provides new liquid chromatography separation patterns, profoundly different from those achieved with known stationary phase materials.

The present invention provides methods of fabricating of a wide variety of carbon monoliths that are especially useful as columns for HPLC and/or EMLC applications. Appropriate modifications to the characteristics of materials used in fabricating the columns allow the achievement of various trade-offs in column efficiency, permeability, rate of separation, column loading capacity, etc. The column is made of a hierarchically porous carbon monolith, which is preferably first clad with a heat shrinkable tube and then encapsulated in a metal or polyether-ether-ketone (PEEK) tube. A carbon monolith, or "skeleton" is characterized by macropores and mesopores (secondary porosity). The secondary porosity contributes to the surface area which is required to achieve the desired separation. Such a hierarchical structure enables fast separation with superior hydraulic properties.

A robust monolith skeleton wall thickness must be at least 100 nm and may be as large as 20 μm. The generally accepted optimal wall thickness for HPLC applications is from 200 nm to 5 μm. HPLC applications in particular require column material that can sustain pressure from 10 bars to 400 bars. Carbon monolithic material of the present invention is surprisingly robust, and can withstand sustains pressure up to 400 bars without undergoing any structural damage or collapse.

Fabrication of a robust carbon monolithic column in accordance with the present invention includes the following general steps: preparation of a carbon monolith precursor having a porosity-generating fugitive phase; carbonization of the precursor and the removal of the fugitive phase; optional graphitization; and encapsulation to form a chromatographic column.

Preparation of Precursor

A carbon monolith precursor is defined as any material that can be carbonized to form a carbon monolith that can be used for a chromatographic separation. The precursor must include a particulate, porosity-generating, fugitive phase which serves as a template for the pores that characterize the final product. A carbon monolith precursor is prepared in any desired shape, but is usually rod-shaped to conform to the general shape and size of a liquid chromatography column. Precursors can be prepared by several methods in accordance with the present invention; several examples are described hereinbelow.

Method 1: Fe Catalyzed Polymer with a Template of Silica Beads

Step 1: Silica beads sized from 800 nm to 10 μm are dispersed in a solvent in a concentration range of 0.1 to 2 g/g using an appropriate dispersing method such as ultrasonic mixing, for example, to form a colloid. The solvent can be any polar solvent or solvent mixture. A mixture of ethanol and water is suggested.

Step 2: $FeCl_3$ is dissolved into the colloid in a concentration range of 0.001 to 0.5 g/g.

Step 3. Resorcinol is dissolved into the colloid in a concentration range of 0.1 to 2.5 g/g.

Step 4. The colloid is agitated to facilitate a reaction to form a resorcinol/Fe(III) complex, illustrated in FIG. 1.

Step 5. A 5% to 37% solution of formaldehyde in water is cooled to a temperature in the range of about 0° C. to 20° C. and added to the colloid in a concentration range of 0.01 to 2.5 g/g.

Step 6. The colloid is cooled to a temperature in the range of about 0° C. to 20° C. and stirred for a time period of 5 min to 30 min to effect homogeneousness.

Figure 2:
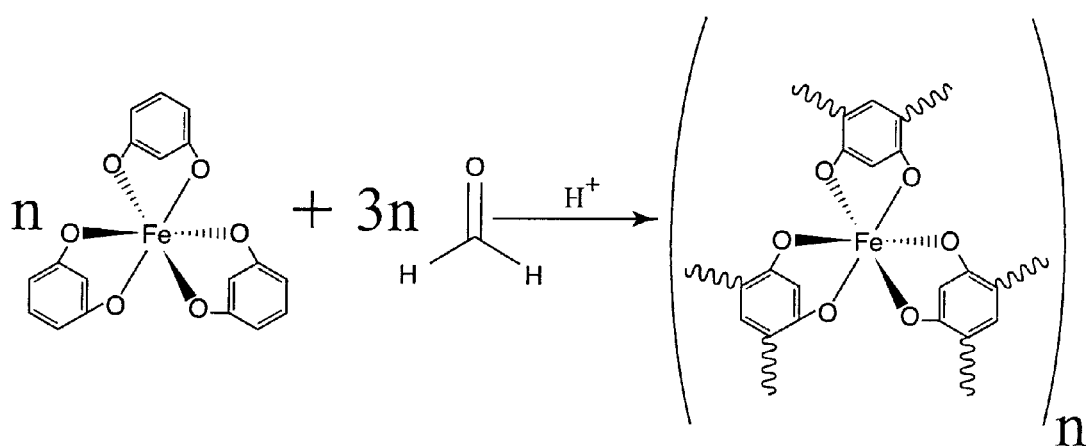
FIG. 2 is a schematic illustration of the co-polymerization of formaldehyde and resorcinol iron (III) complex.

Step 7. The colloid is transferred into a mold of desired monolith shape and heated to a temperature in the range of about 50° C. to 95° C. for a time period of 0.5 h to 20 h to effect polymerization of the colloid into a solid monolith, shrinkage of the monolith from the mold wall, and curing of the monolith. FIG. 2 shows the polymerization reaction.

Step 8. The solid monolith is removed from the mold and the solvent is evaporated therefrom to dryness.

Step 9. The dry monolith is cured at a temperature in the range of about 40° C. to 150° C. for a time period of 3 h to 20 h to effect complete polymerization of the monolith material.

Example I 6 g of silica beads were dispersed in 5 g of an aqueous solution of ethanol (80% ethanol, 20% water) using an ultrasonic mixer. 1.08 g $FeCl_3$ was then dissolved into the suspension, followed with 2.2 g of resorcinol, dissolved by hand shaking. The colloid solution turned dark immediately after the addition of resorcinol, indicating the formation of a resorcinol/Fe(III) complex. 2.4 g of an ice-cooled, 37% formaldehyde solution in water was introduced into this mixture, in one step, with hand shaking. The mixture was kept in an ice-water bath for 10 minutes with magnetic stirring. After removal of the ice-water bath, the mixture was slowly transferred into 5 mm ID glass tubes which were capped when filled. These tubes were then placed in a 70° C. water bath. The mixture polymerized rapidly into a solid rod inside the glass tube. This rod detached from the tube wall because of the shrinkage caused by polymerization. The polymer rod was aged time period of 5 h in the glass tube, which was kept in the hot-water bath. The crack-free phenolic resin/silica rods were removed from the glass tubes by shaking each tube toward its open end. The wet rod was put into the hood for three days, in order to evaporate the solvent. Finally, it was thoroughly dried in a vacuum oven at 80° C., time period of 10 h. The dried rods were further cured at 135° C. for 4 h to ensure complete polymerization.

Method 2: Fe Catalyzed Polymer with a Template of Polystyrene Beads

This method is essentially the same as Method 1 above, the only difference being that polystyrene beads replace the silica beads.

Method 3 Fe Catalyzed Polymer With A Duplex Template Of Silica Beads

This method is also similar to Method 1, but a suspension of silica beads of two discrete, different particle sizes is used. The larger particles can generally be in a size range of 800 nm to 10 μm, the smaller particles can generally be in a size range of 6 nm to 100 nm, and the population ratio of the larger particles to smaller particles can generally be in a range of 0.1 to 10.

After Step 6 as described above, the colloid is subject to centrifugation at a sufficient RPM and for a sufficient period of time to effect formation of large particles into a compacted ordered macroporous colloidal array while the small particles remain as a stable suspension in the interstices of the array. The porosities of the macropore and mesopore arrays can be finely adjusted by varying the ratio of the differently sized particles.

Example II

Generally following the method of Example 1, 2 g of silica beads having a particle size of 5 μm and 1 g of silica beads having a particle size of 13 nm were used. Following introduction of the formaldehyde solution, the colloid was centrifuged at about 3000 RPM for 30 min. Only the large particles form a compacted ordered colloidal array while the small particles remain as a stable suspension between them. After removal of the supernant, poly-condensation of the colloidal array into a rod was carried out in the centrifuge tube in an oven at 50° C.

Method 4: Fe Catalyzed Polymer with a Duplex Template of Polystyrene Beads

This method is essentially the same as Method 3 above, the only difference being that polystyrene beads replace the silica beads.

Figure 3:
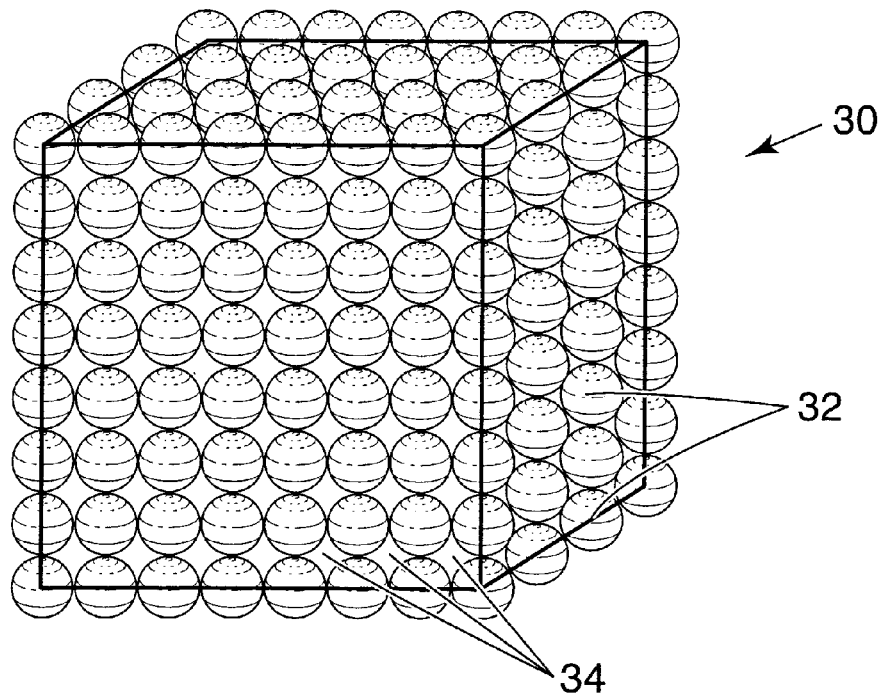
FIG. 3 is a schematic illustration of a carbon precursor tailored by colloidal spheres in accordance with the present invention.

For a better understanding of the above described colloidal templating methods, FIG. 3 illustrates the fabrication of the precursor monoliths made via methods 1 to 4. The colloidal array 30 can be silica and/or polystyrene spheres 32. The voids 34 are filled with carbon precursor. As will be described hereinbelow, silica spheres are removed by HF or NaOH after carbonization, and polystyrene spheres are removed by thermal decomposition during carbonization, leaving a carbon skeleton.

Method 5: Double Condensation Method

An ethanol solution of tetraethoxylsilane (TEOS) in a concentration of 0.1 to 5 g/g, polyethylene-oxide-propylene-oxide-ethylene-oxide (P123) in a concentration of 0.1 to 5 g/g, and 1M HCl in a concentration of 0.0001 to 0.04 g/g is prepared. The mixture is cast into a tube and gelled into a monolith at a temperature in the range of about 30° C. to 80° C. for a time period in the range of about 2 h to 10 h. The monolith is then dried at a temperature in the range of about 50° C. to 150° C., preferably in a vacuum oven.

Example III 10.4 g of TEOS, 8.7 g P123 and 3.5 g 1 m HCl were mixed in 69 g ethanol.

The mixture reacted at 70° C. for 1.5 h. 3.3 g resorcinol in 3.6 g 37% formaldehyde was added into the mixture after the removal of ethanol by vacuum. The final mixture was introduced into a glass tube and reacted at 80° C. for 4 h. Afterwards the rod was thoroughly dried in a vacuum oven at 100° C.

Method 6: Reaction induced dual phase separation of ternary organic mixture

Figure 4:
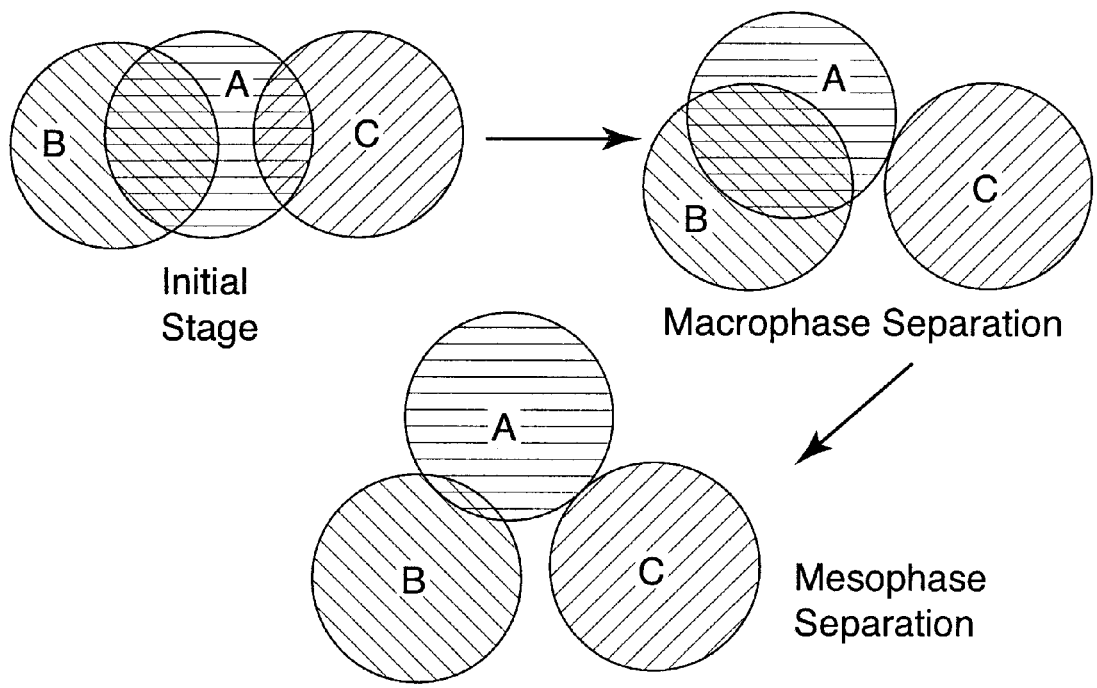
FIG. 4 is a schematic illustration showing the principle of reaction induced phase separation of a ternary system in accordance with the present invention.

A homogeneous solution of component A, component B, and component C is induced to perform dual phase separation via reaction. The polymerization of component A induces a primary phase separation of polymerized component A and component C in micron or submicron scale. As component A polymerizes, component B becomes enriched in the polymerized phase of component A. With further polymerization of component A, component B separates from component A, resulting in a secondary, nanometer scale phase separation. The removal of components B and C yields the desired hierarchical porous structure of the carbon precursor needed to carry out the present invention. FIG. 4 shows schematically the principle of the polymerization induced phase separation the ternary system.

In this system, component A is carbon forming agent, component B is a mesopore forming agent, and component C is a macropore forming agent. The three components are mixed together, transferred into a mold of desired monolith shape, allowed to settle for a time period of 2 h to 20 h and heated to a temperature in the range of about 40° C. to 50° C. for a time period of 1 h to 72 h to effect curing of the monolith. The monolith is then hardened by treating with 20% to 80% sulfuric acid for a time period of 2 h to 10 h. Components B and C are then removed by washing the monolith, for example, with copious water. The monolith can then be thoroughly dried. Drying method is not critical, but it is suitable to dry the monolith in a vacuum oven at nominal 100° C.

Component A is generally comprised of at least one monomer, and can be selected from at least the following examples: furfuryl alcohol, alkyl substituted furfuryl alcohol, furfuryl aldehyde, alkyl substituted furfuryl alcohol, phenol, alkyl phenol, phenolic alcohol, and alkyl substituted phenolic alcohol, epoxy, and polymers of the aforementioned compositions.

Component B can be comprised of at least one surfactant and/or a low-charring polymer. Nearly all surfactants, including ionic surfactants and nonionic surfactants are contemplated as suitable for use as component B. Polyethylene oxides of various molecular weights, generally in the range of 200 to 100000 Dalton, are suitable candidates for component B.

Oligomer C can be selected from at least the following examples: ethylene glycol, diethylene glycol, triethylene glycol, tetraenthylene glycol, poly ethylene glycol, oleic acid, propylene glycol, dipropylene glycol, and water.

Polymerization catalysts, crosslinkers, and/or curing agents can be added to the mixture.

Example IV

Two solutions were made separately. 4 g of p-toluenesulforic acid monohydrate dissolved in 46 g of diethylene glycol. 25 g of surfactant P123 dissolved in 25 g of furfuryl alcohol. These two solutions were then mixed with mechanic stirring at room temperature. This mixture was them cast into a cylindrical model of appropriate diameter and settle at room temperature for a time period of 12 h before final curing at 70° C. for 24 h. The cured mixture formed an organic polymer rod with interconnected macropores which filled with the macropore forming agent. The rod was hardened by treating the rod with 60% sulfuric acid at 80° C. for a time period of 2 h. The surfactant and the macropore forming agents were then removed by washing the rod with copious water. The rod was thoroughly dried in a vacuum oven at 100° C.

Carbonization, Removal of Fugitive Phase, and Graphitization

Precursors made as described above can be carbonized by any conventional carbonization method. Carbonization can generally comprise heating in an inert environment. The particular method is not critical to the invention, although some methods will be found to be better than others, depending on the desired result.

Following carbonization, soluble fugitive phases and catalysts are removed by dissolution with a solvent that does not harm the carbonized monolith. Thermally decomposable and or volatile fugitive phases are generally removed during carbonization and/or graphitization.

Carbonized monoliths can then be graphitized by any conventional graphitization method. Graphitization can generally comprise heating in an inert environment to a temperature exceeding the carbonization temperature. The particular method is not critical to the invention, although some methods will be found to be better than others, depending on the desired result. Graphitization is preferred because it essentially eliminates microporosity (pores<18 Å), but a non-graphitized carbon monolith can be used for some applications. Microporosity can be also blocked by known chemical modification methods.

Figure 5:
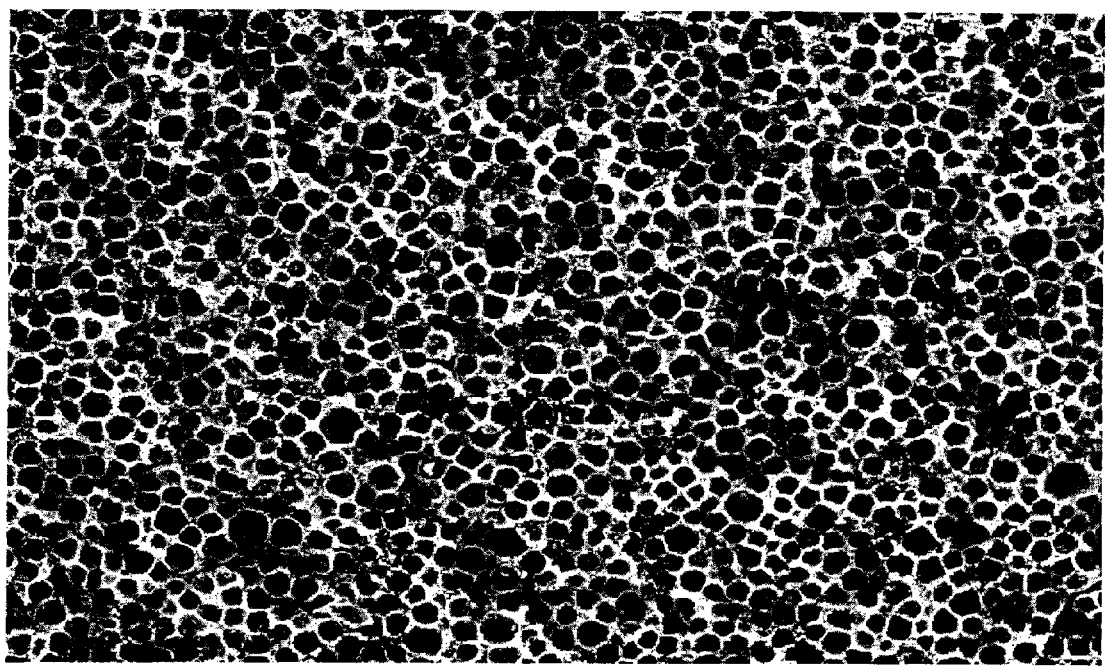
FIG. 5 is a photomicrograph showing the macropore morphology of a carbon monolith made by disordered colloidal templates in accordance with the present invention.
Figure 6:
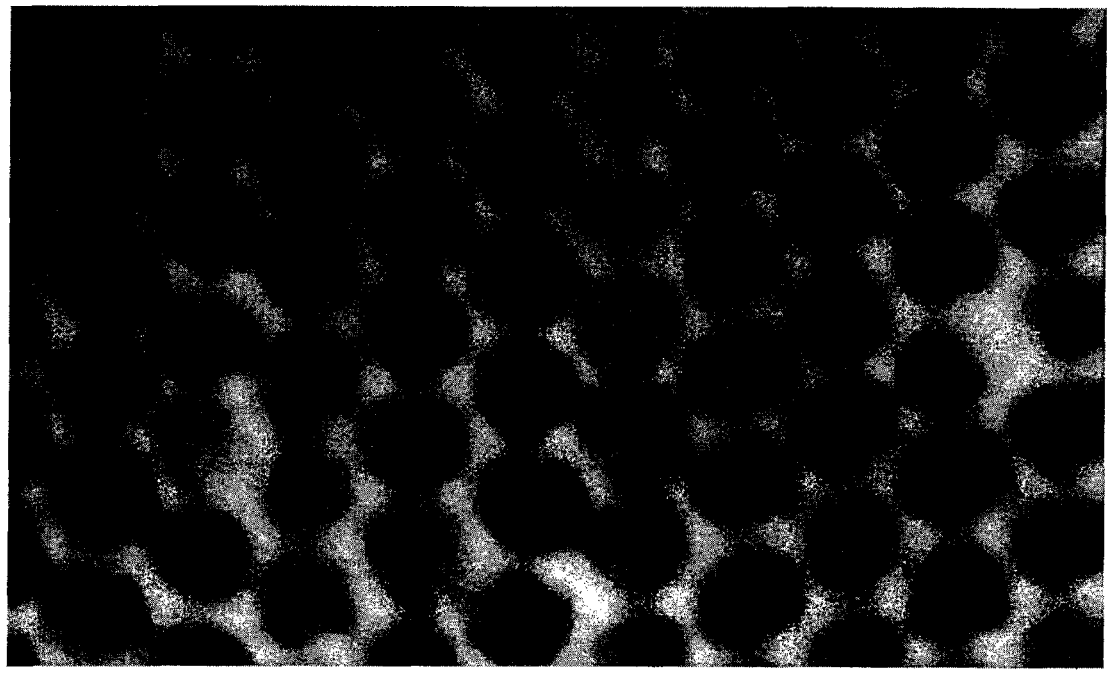
FIG. 6 is a photomicrograph showing the morphology of a carbon monolith made by ordered colloidal array in accordance with the present invention.
Figure 7:
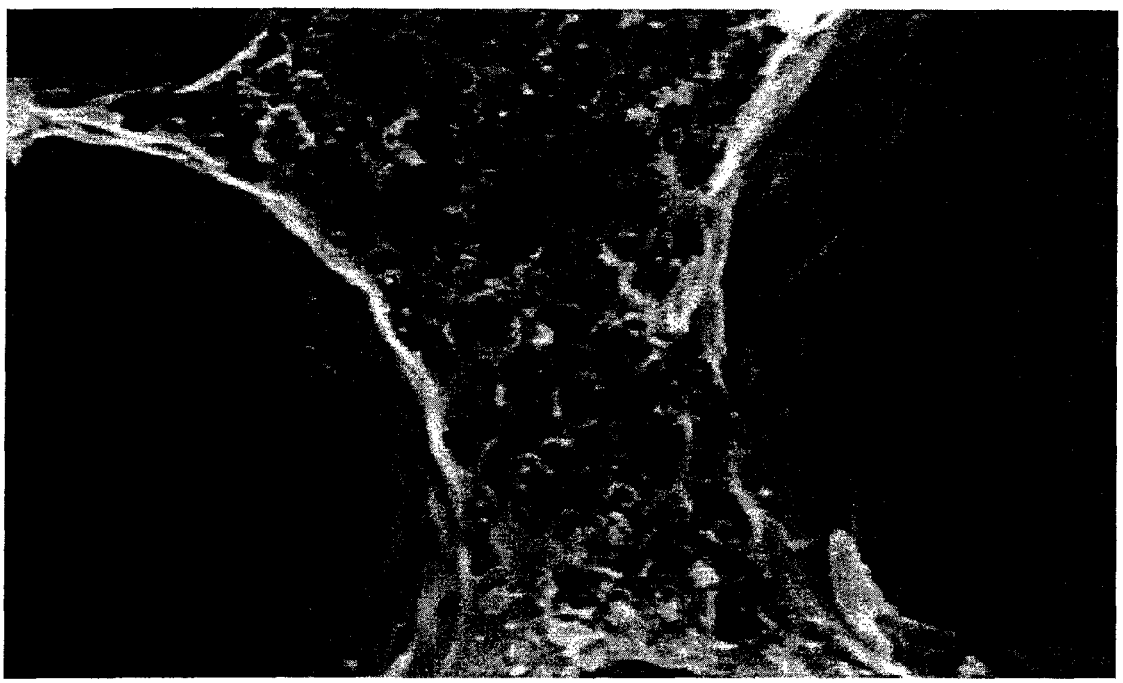
FIG. 7 is a photomicrograph showing the secondary porosity of a carbon monolith made by colloidal templates in accordance with the present invention.
Figure 8:
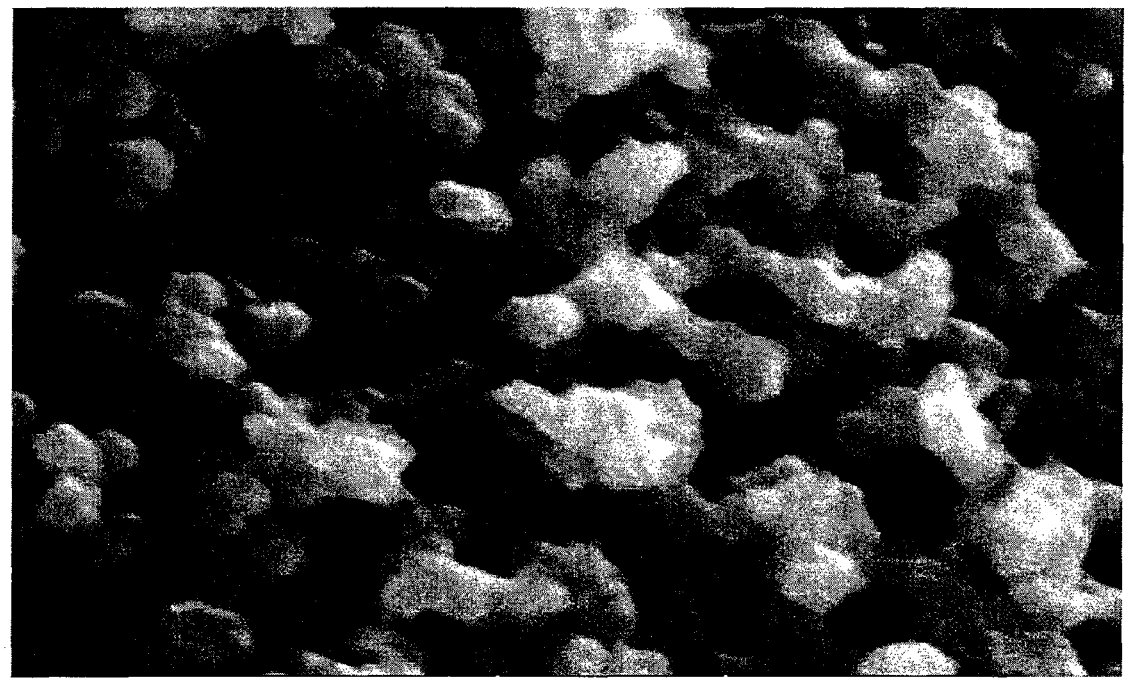
FIG. 8 is a photomicrograph showing the morphology of a carbon monolith which has 800 nm macropores with the skeleton size of 250 nm in accordance with the present invention.
Figure 9:
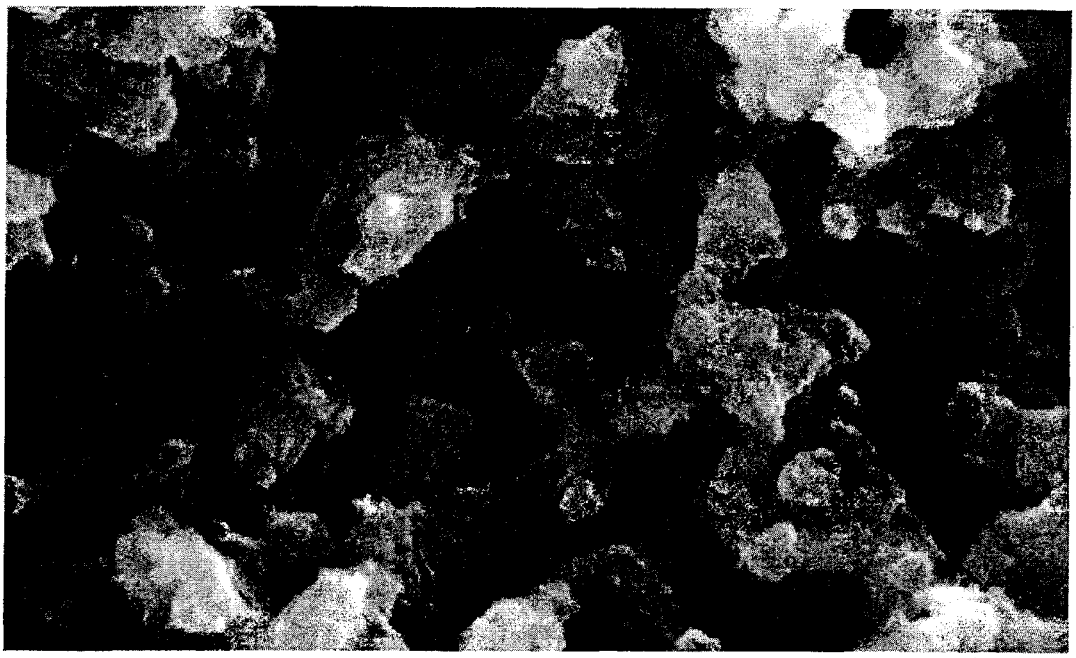
FIG. 9 is a photomicrograph showing the sample has 1.5 μm macropores in accordance with the present invention.
Figure 10:
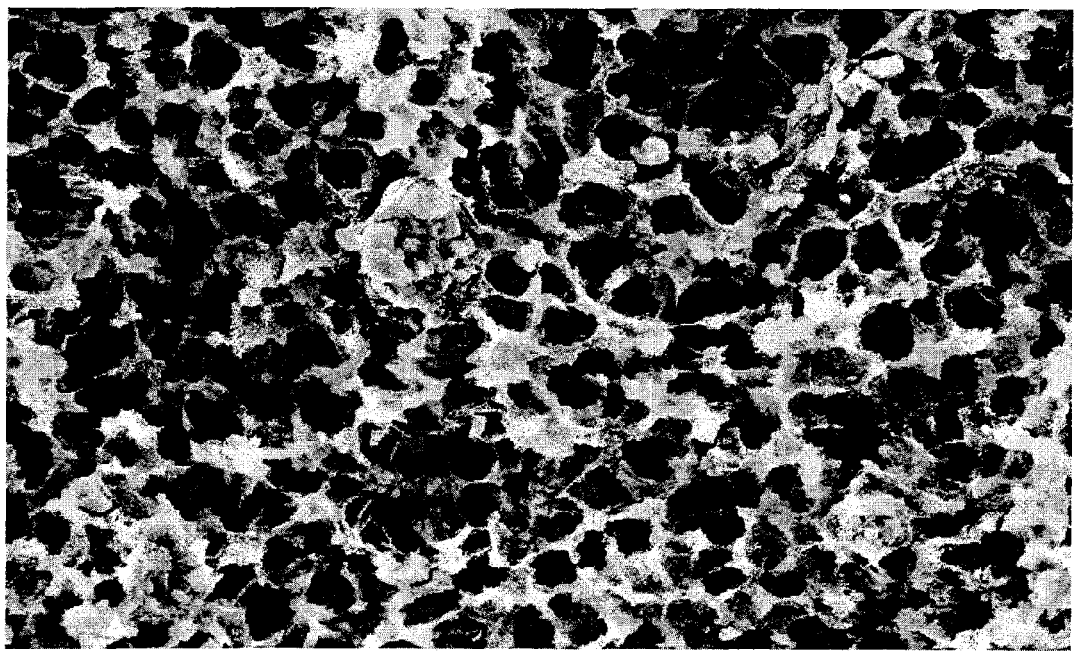
FIG. 10 is a photomicrograph showing a carbon sample with 2 μm macropores in accordance with the present invention.
Figure 11:
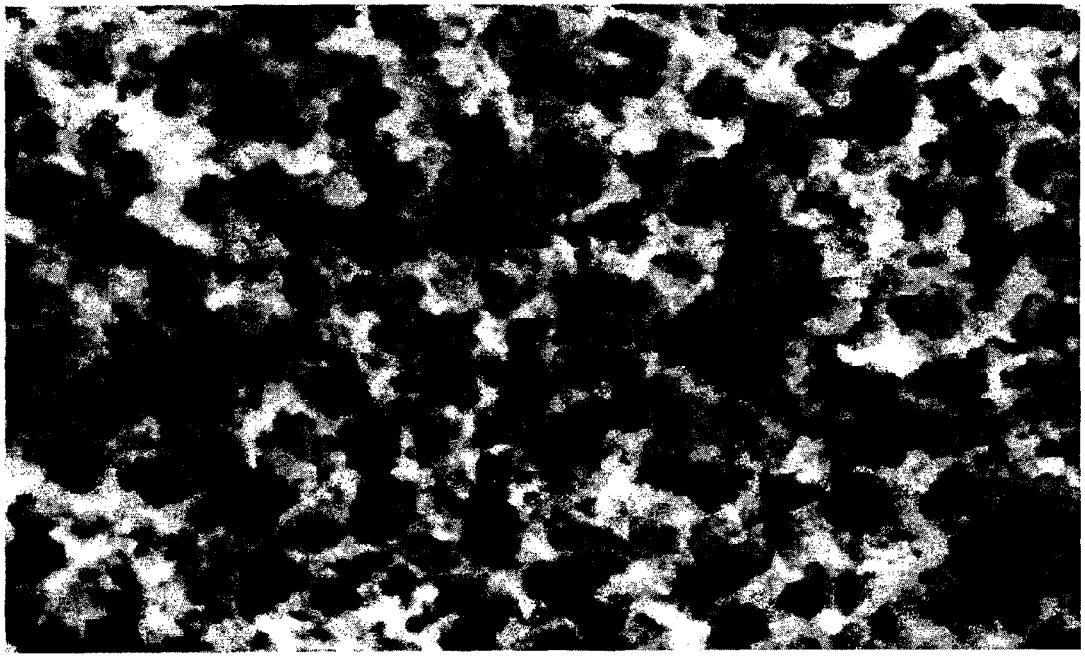
FIG. 11 is a photomicrograph showing a carbon sample with 3 μm macropores in accordance with the present invention.
Figure 12:
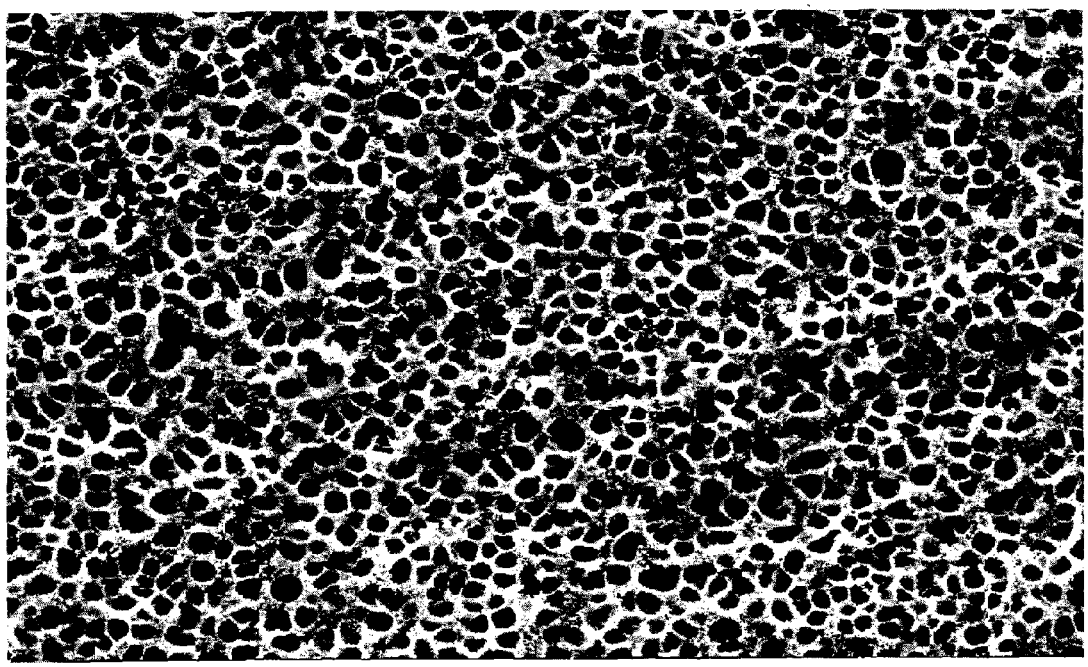
FIG. 12 is a photomicrograph showing a carbon sample with 5 μm macropores in accordance with the present invention.
Figure 13:
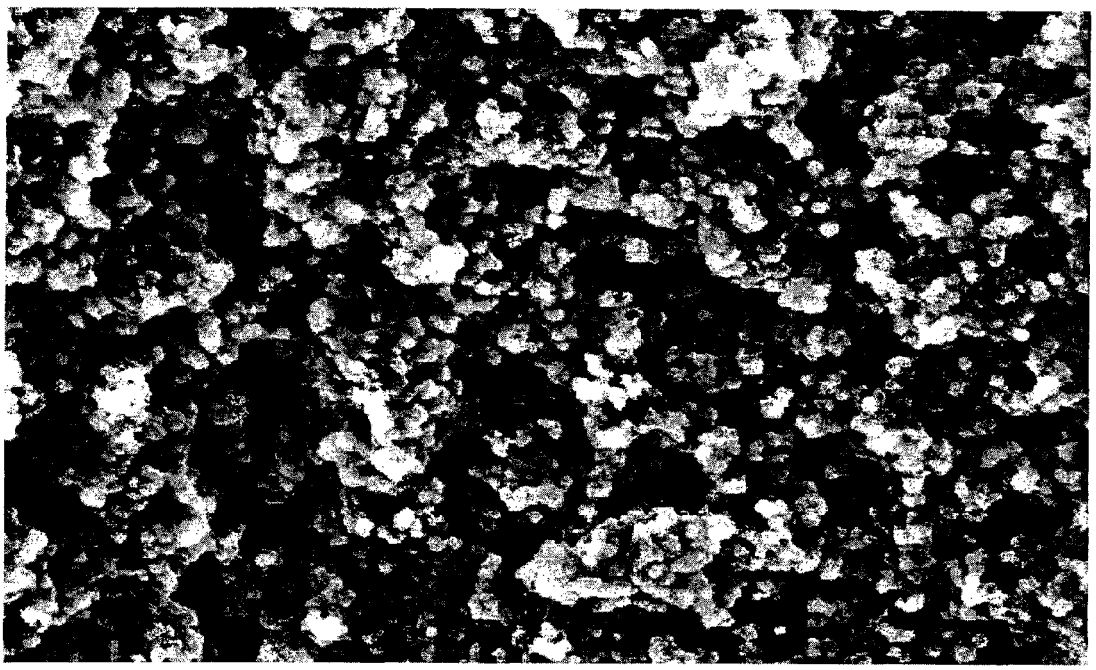
FIG. 13 is a photomicrograph showing a carbon sample with approximate 10 μm macropores in accordance with the present invention.
Figure 14:
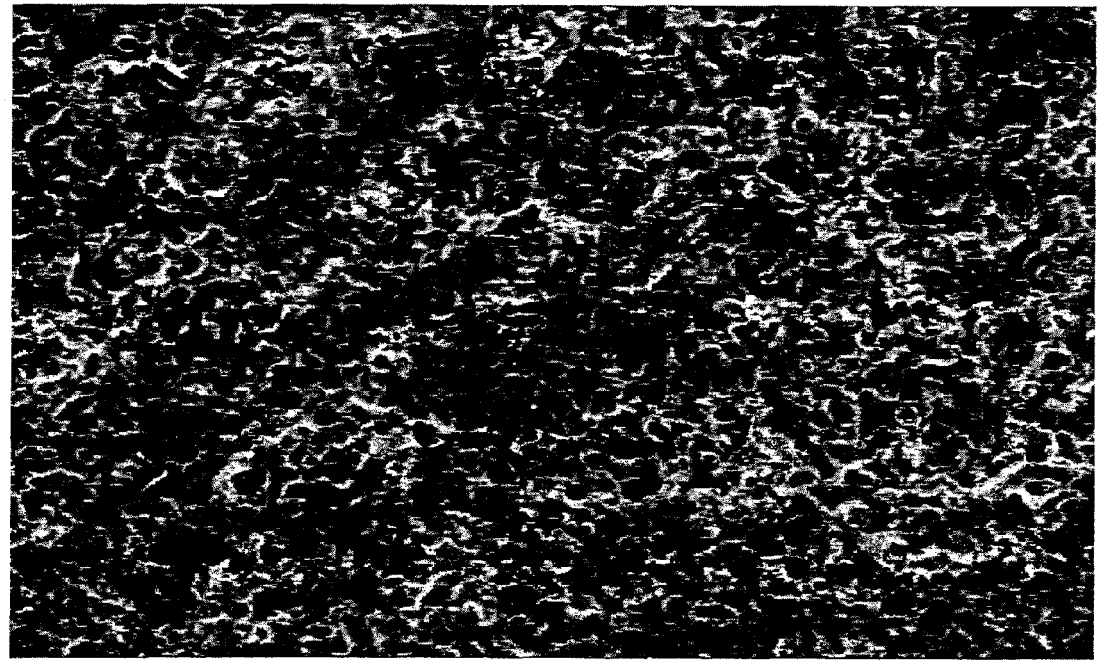
FIG. 14 is a photomicrograph showing a carbon sample with about 20 μm macropores in accordance with the present invention.

Carbonization of precursor monoliths made by Methods 1, 3, and 5 described above is followed by the removal of silica template and/or catalyst, which is followed by graphitization. FIGS. 5 to 7 show the morphologies of carbon monoliths made via colloidal templates.

Example VI

Precursor rods which were made by Methods 1, 3, and 5 described above were placed into a cylindrical furnace, purged with N2 (45 ml/min) A programmed temperature cycle was applied to the furnace. The temperature was first ramped from 135 to 800° C. at 2.5° C./min and then kept constant at 800° C. for 2 h, to ensure complete carbonization. A second temperature ramp took place from 800° C. to 1250° C. at 10° C./min. The temperature was kept constant at 1250° C. for 1 h. Afterward, the furnace was allowed to cool naturally to ambient temperature. The silica beads and the iron catalyst were removed by washing with a concentrated solution of hydrofluoric acid followed by rinsing with copious amounts of distilled water. The porous carbon rod obtained was thoroughly dried under vacuum at 80° C.

Example VII

Porous carbon rods made in accordance with Example VI were graphitized by high temperature treatment (HTT). The temperature ramps were programmed as a slow ramp from room temperature to 1600° C. at the rate of 5° C./min, and then followed by a rapid ramp to 2400° C. at the rate of 10 to 20° C./min. The temperature was kept at 2400° C. for 10 to 30 minutes then cooled down to ambient temperature.

The pore forming agents used in Methods 2, 4, and 6 are thermally decomposable and/or volatile. Following carbonization, the carbon monolith does not generally contain any other elements except carbon. Therefore, a single process can be used to carbonize the precursor, remove the fugitive phase (generally via decomposition and/or volatilization), and graphitize the carbon monolith. The precursor made via method 6 is carbonized and graphitized by heating, preferably in a controlled fashion, from room temperature to graphitization temperature which is in the range of 2100° C. to 2800° C.

Example VIII

Precursor rods prepared by Methods 2, 4, and 6 described above were carbonized and graphitized through a programmed continuous temperature procedure. A slow temperature ramp at the rate of 0.1 to 1° C./min was applied from room temperature to 750° C. to carbonize the polymer rods and followed by a fast temperature ramp at the rate of 2 to 20° C./min to the 2400° C./min and hold at 2400° C. for half an h to graphitize the carbonized rods.

Figure 15:
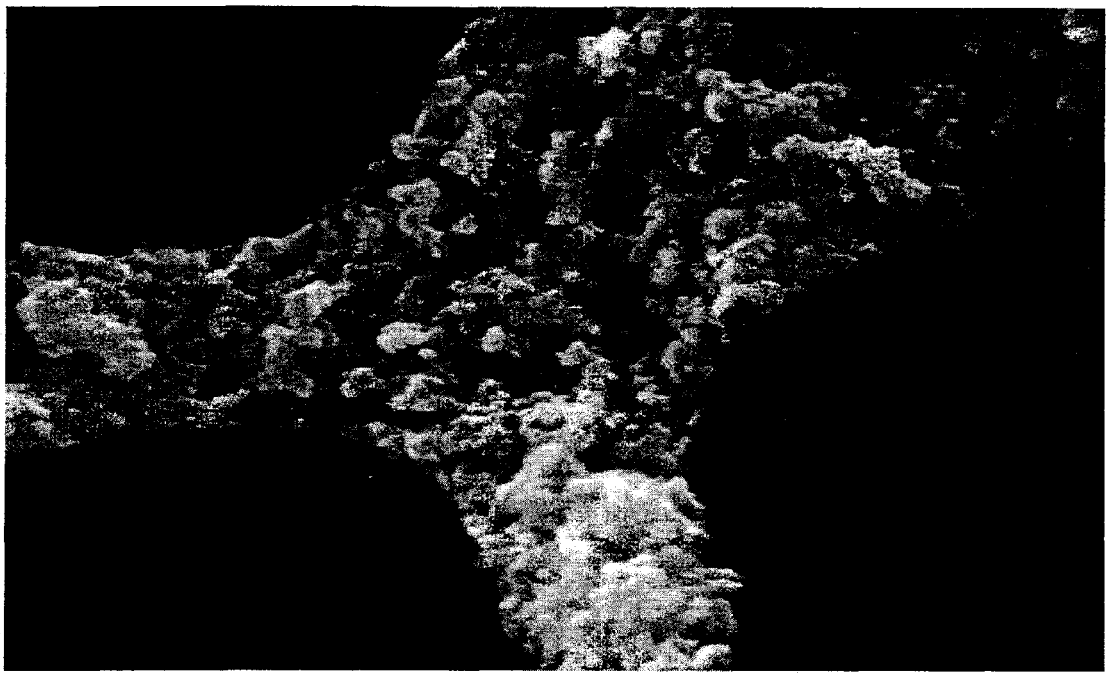
FIG. 15 is a photomicrograph showing the secondary porosity of a carbon monolith in accordance with the present invention.
Figure 16:
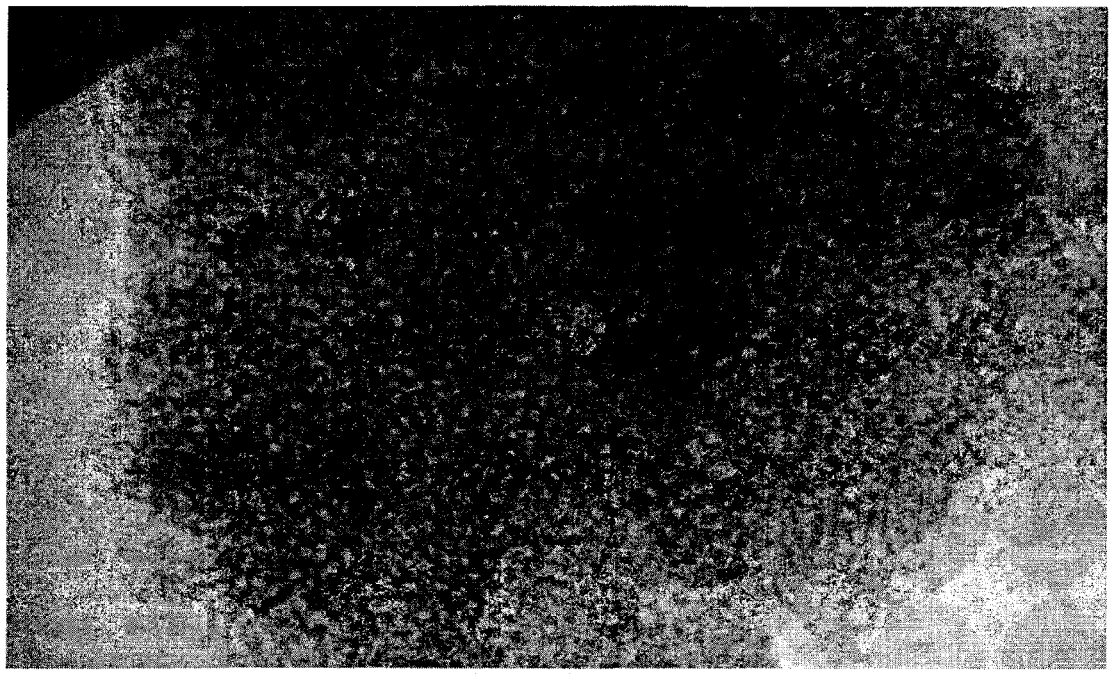
FIG. 16 is a TEM image of the mesopores on a carbon monolith in accordance with the present invention.

By varying the pore forming agents the sizes of the macropores and mesopores can be finely adjusted within the limits set forth hereinabove. FIGS. 8 to 14 show morphologies of macropores with various sizes. These macropores are the primary porosity of the carbon monoliths. A secondary phase separation results in the secondary porosity on the carbon skeleton. FIG. 15 shows the secondary porosity on the carbon skeleton. FIG. 16 shows the mesopores examined by transmission electron microscopy (TEM).

Cladding of Graphitized Monolith

Figure 17A:
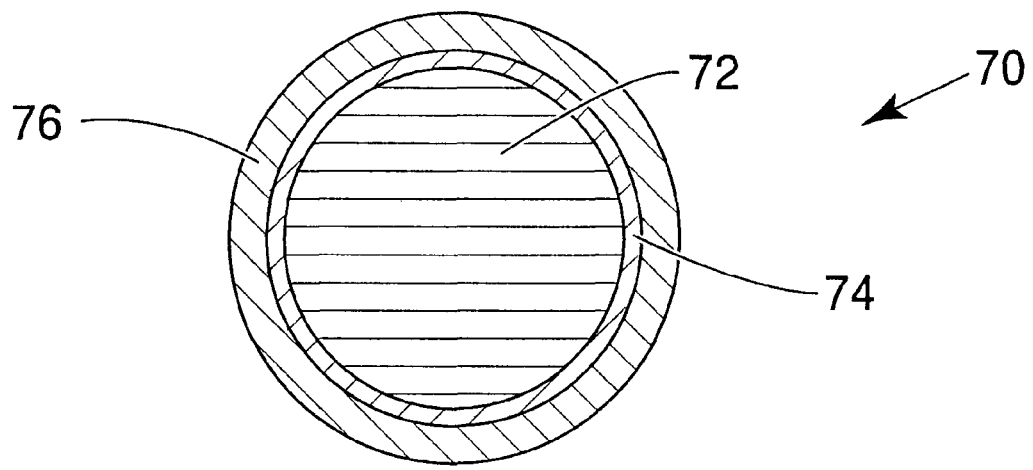
FIG. 17a is a schematic illustration showing a radial cross-section of a carbon column in accordance with the present invention.
Figure 17B:
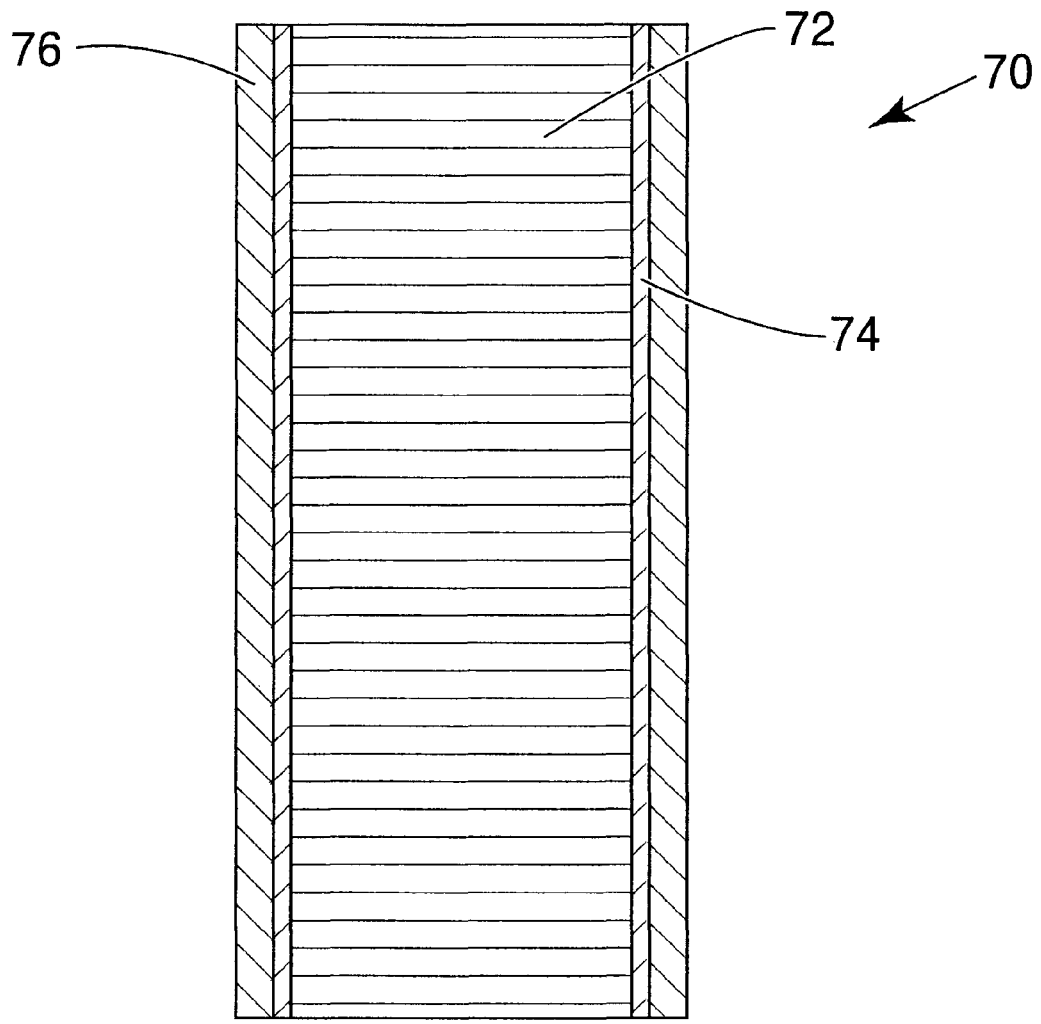
FIG. 17b is a schematic illustration showing an axial cross-section of a carbon column in accordance with the present invention.

Following graphitization, the robust carbon monolith is fabricated into a column for liquid chromatography in accordance with the present invention. FIG. 17 schematically illustrates the cross-section of a carbon column 170. First, the monolith 172 can be clad with an inert cladding 174, such as polytetrafluoroethylene (PTFE).

Fabrication of Chromatography Column

The clad monolith is subsequently coated with a cementing agent such as epoxy cement, and inserted into a structurally robust tube that is suitable for use as a liquid chromatography column. Typical tubes are ¼" stainless steel tubing, cut to typical or desired length. After the cement cures, the column is complete and ready to be connected to a liquid chromatography system, generally using reduction unions. A variety of different columns can be made by using carbon monoliths of different diameters and lengths. The dimension of the column can thus be varied due to the requirements of applications.

Example IX

The carbon rod was clad in an oven at 340° C. with a section of heat-shrinkable Teflon tubing. The encapsulated carbon rod was then cemented into a precut stainless steel tube, with epoxy cement.

Various cladding materials may be used to encapsulate the porous carbon monolith in accordance with the present invention. The cladding materials can be thin tubes made of, for example, heat-shrinkable PTFE, PEEK, fluorinated ethylene propylene (FEP), perfluoroalkoxy (PFA), or mixtures of these polymers. They are available in all necessary sizes and grades. Some are resistant to the same chemicals as the carbon monoliths. When the carbon monolith is encapsulated with a section of heavy-duty-walled heat-shrinkable tube, the end fits can be directly attached to the column without the shield of steel tube. For example, when the carbon monolith is clad with a section of thick wall heat shrinkable PEEK tube, end fitting nuts can be directly machined on the column.

FIGS. 16-17 show schematically, not to scale, a chromatography column 70 including carbon monolith 72, cladding 74, and tube 76.

The monolithic carbon column can be made into any dimensions with any desired shape and dimensions in accordance with the present invention. Examples of contemplated shapes include, but are not limited to rod, disk, tube, annular, angular, helical, coil, etc.

The monolithic carbon column can be subject to chemical treatment of the carbon monolith with functionalities for the enhancement of the separation effect. Examples of chemical treatment include, but are not limited to: chemically oxidizing the carbon surface; chemically grafting ligands and/or organic chains to the carbon surface; electrochemically reducing aryl diazonium salts on the carbon surface; electrochemically oxidizing alkylamines on the carbon surface; electrochemically oxidizing arylacetates on the carbon surface; and electrochemically oxidizing alcohols on the carbon surface.

Moreover, the monolithic carbon column can be subject to physical treatment of the carbon monolith with functionalities for the enhancement of the separation effect. Examples of physical treatment include, but are not limited to physical absorption of functional molecules such as surfactants, macromolecules, crown ether, porphyrin, and other compositions that are generally used for the purpose of enhancing chromatographic separations.

The monolithic carbon column can be used as sorbents for solid phase extraction processes.

The monolithic carbon column can be used for gas chromatography and any other type of analytical chromatographic separation.

The monolithic carbon column can be used as catalyst bed. For example, catalyst particles can be chemically or electrochemically deposited in the pores of the carbon monolithic column. Various catalyst particles can be used to catalyze various reactions.

The monolithic carbon column can be used as porous electrode for any electrochemical system, especially those that require high electrode surface area. The carbon monolithic column can also be used as a flow-through electrode for continuous electrochemical processes.

The present invention is generally characterized by at least three advantages in liquid chromatography applications:

1) Carbon monolithic columns made in accordance with the present invention have an extremely high resistance to aggressive chemicals. They can be used with solutions having any pH (from below 0 to above 14, if needed), with nearly any solvent or solvent mixtures, and at any practical temperature. The carbon monolithic columns can generally be attacked only by concentrated hydrogen peroxide, solutions of organic peroxides and of ozone, and are free from many of the disadvantages of silica- or polymer-based columns.

2) Benefiting from the monolithic structure, carbon monolithic columns exhibit a much lower back pressure than columns packed with small particles. This makes the present invention most suited for fast separations.

3) Carbon monolithic columns made in accordance with the present invention exhibit a high electrical conductivity and are electrically homogeneous. This makes them ideal for EMLC.

The present invention can be, among other applications, used as the working electrode of EMLC columns. The column may be configured as a 2-electrode or a 3-electrode EMLC column. According to the requirements of the analyst, the counter-electrode and of the reference electrode could be placed in the column, upstream, or downstream of the column. FIG. 18 shows a configuration of a carbon column connected in an EMLC system While there has been shown and described what are at present considered the preferred embodiments of the invention, it will be obvious to those skilled in the art that various changes and modifications can be prepared therein without departing from the scope of the inventions defined by the appended claims.

What is claimed is:

1. A carbon monolith comprising a carbon skeleton having a wall thickness of at least 100 nm, and a hierarchical pore structure having essentially uniform sized macropores and essentially uniform sized mesopores, the macropores defined by walls of the carbon skeleton and having a size ranging from 0.05 μm to 100 μm, the mesopores having a size ranging from 18 Å to 50 nm and being present on the carbon skeleton, wherein the carbon skeleton does not undergo structural collapse at 525,000 TEM magnification.

2. A carbon monolith in accordance with claim 1 wherein said carbon monolith is characterized by the wall thickness of 100 nm to 20 μm.

3. A carbon monolith 10 in accordance with claim 2 wherein said carbon monolith is characterized by the wall thickness of 200 nm to 10 μm.

4. A carbon monolith 10 in accordance with claim 3 wherein said carbon monolith is characterized by the wall thickness of 400 nm to 1 μm.

5. A carbon monolith in accordance with claim 1 wherein said macropores are of a size range of 0.1 μm to 50 μm.

6. A carbon monolith in accordance with claim 5 wherein said macropores are of a size range of 0.8 μm to 10 μm.

7. A carbon monolith in accordance with claim 1 wherein said mesopores are of a size range of 5 nm to 30 nm.

8. A monolithic chromatography column comprising a robust monolithic carbon stationary phase disposed in a chromatography column, said monolithic carbon stationary phase comprising a carbon skeleton having a wall thickness of at least 100 nm, and a hierarchical pore structure having essentially uniform sized macropores and essentially uniform sized mesopores, the macropores defined by the walls of the carbon skeleton and having a size range of 0.05 μm to 100 μm, the mesopores having a size ranging from 18 Å to 50 nm and being present on the carbon skeleton, wherein the carbon skeleton does not undergo structural collapse at 525,000 times TEM magnification.

9. A monolithic chromatography column in accordance with claim 8 wherein said carbon skeleton is characterized by the wall thickness of 100 nm to 20 μm.

10. A monolithic chromatography column in accordance with claim 9 wherein said carbon skeleton is characterized by the wall thickness of 200 nm to 10 μm.

11. A monolithic chromatography column in accordance with claim 10 wherein said carbon skeleton is characterized by the wall thickness of 400 nm to 1 μm.

12. A monolithic chromatography column in accordance with claim 10 wherein said macropores are of a size range of 0.1 μm to 50 nm.

13. A monolithic chromatography column in accordance with claim 12 wherein said macropores are of a size range of 0.8 μm to 10 μm.

14. A monolithic chromatography column in accordance with claim 10 wherein said mesopores are of a size range of 0.5 nm to 40 nm.

15. A monolithic chromatography column in accordance with claim 14 wherein said mesopores are of a size range of 5 nm to 30 nm.

16. A monolithic chromatography column in accordance with claim 8 wherein said monolithic carbon stationary phase further comprises graphite.

* * * * *